US012697841B2

(12) United States Patent
Gunduz et al.

(10) Patent No.: US 12,697,841 B2
(45) Date of Patent: Aug. 4, 2026

(54) HIGH TENSILE NYLON 6.6 YARN

(71) Applicant: KORDSA TEKNIK TEKSTIL A.S., Kocaeli (TR)

(72) Inventors: Cansu Gunduz, Kocaeli (TR); Mehmet Sadettin Fidan, Kocaeli (TR)

(73) Assignee: KORDSA TEKNIK TEKSTIL A.S., Kocaeli (TR)

( * ) Notice: Subject to any disclaimer, the term of this patent is extended or adjusted under 35 U.S.C. 154(b) by 821 days.

(21) Appl. No.: 18/008,450

(22) PCT Filed: Jun. 23, 2020

(86) PCT No.: PCT/TR2020/050538
§ 371 (c)(1),
(2) Date: Dec. 6, 2022

(87) PCT Pub. No.: WO2021/262102
PCT Pub. Date: Dec. 30, 2021

(65) Prior Publication Data
US 2023/0211635 A1 Jul. 6, 2023

(51) Int. Cl.
*B60C 9/00* (2006.01)
*B60C 9/04* (2006.01)
*B60C 9/22* (2006.01)
*D01F 6/60* (2006.01)
*D02G 3/02* (2006.01)
*D02G 3/48* (2006.01)

(52) U.S. Cl.
CPC ............. *B60C 9/0042* (2013.01); *D02G 3/02* (2013.01); *D02G 3/48* (2013.01); *B60C*

*2009/0085* (2013.01); *D10B 2331/02* (2013.01); *D10B 2401/063* (2013.01)

(58) Field of Classification Search
None
See application file for complete search history.

(56) References Cited

U.S. PATENT DOCUMENTS 4,623,011 A * 11/1986 Kanuma ............... B60C 9/0042
152/565
2003/0155059 A1 8/2003 Noel et al.
2014/0216625 A1 8/2014 Peschek et al.
2019/0135039 A1 5/2019 Filiol et al.

FOREIGN PATENT DOCUMENTS

EP 0448901 A1 10/1991
EP 0733496 A1 9/1996
EP 3469122 B1 12/2019
(Continued)

OTHER PUBLICATIONS

Complete Textile Glossary, 2001, Celanese Acetate LLC, New York, NY, 209 pgs.†

*Primary Examiner* — Ha S Nguyen
(74) *Attorney, Agent, or Firm* — Bayramoglu Law Offices LLC

(57) ABSTRACT

A nylon 6.6 yarn suitable for a tire cord reinforcement for pneumatic tires includes higher than 12.0 g/dtex Tensile Reinforcement Index (TRI) and tenacity between 9.3 g/dtex-10.5 g/dtex, where the TRI is defined as: TRI (g/dtex) =Tenacity (g/dtex)+Stress at 7% Elongation. The nylon 6.6 yarn is suitable for using as tire cord reinforcement in pneumatic tires.

7 Claims, 2 Drawing Sheets

(56) References Cited

FOREIGN PATENT DOCUMENTS

| EP | 3469123 | B1 |   | 3/2020 |            |           |
|----|---------|----|---|--------|------------|-----------|
| JP | 61034216 | A | * | 2/1986 |            |           |
| WO | 9925571 | A1 |   | 5/1999 |            |           |
| WO | 2014104680 | A1 |   | 7/2014 |            |           |
| WO | WO-2014129991 | A1 | * | 8/2014 | .......... | B60C 9/0042 |
| WO | 2017127032 | A1 |   | 7/2017 |            |           |

* cited by examiner
† cited by third party

HIGH TENSILE NYLON 6.6 YARN

CROSS REFERENCE TO THE RELATED APPLICATIONS

This application is the national phase entry of International Application No. PCT/TR2020/050538, filed on Jun. 23, 2020, the entire contents of which are incorporated herein by reference.

TECHNICAL FIELD

The present invention relates to the high tenacity-high modulus nylon 6.6 yarn superior for using as tire cord reinforcement in pneumatic tires.

BACKGROUND

It is well known that nylon 6.6 yarns have bi-elastic tensile properties, which means low initial modulus and higher final modulus. The low initial modulus makes the tire lifting/expansion process possible without any distortions in green tire, and high final modulus (modulus after transition point from low to high modulus) improves high speed tire durability as cap ply in pneumatic radial tires.

In addition to bi-elastic tensile behaviour, the tensile strength, in other words tenacity is also very important parameter providing high burst strength in carcass and increased plunger energy in cap ply. The increased breaking strength or tenacity enables also to use thinner (lower dtex) cords which can reduce the rolling resistance by reducing rubber gauge. That s why, high tenacity and high modulus yarns as raw material for preparation of final heat-set and dipped cords have advantage to reach enhanced final tensile properties compared to the regular nylon 6.6 yarns.

EP3469122B1 and EP3469123B1 relate to a high modulus nylon 6.6 cords as reinforcement in pneumatic tires and mechanical rubber goods, but they do not disclose the the balance between tensile strength (tenacity) and modulus (SASE) and importance of the tensile strength (tenacity) for 6.6 nylon cords.

SUMMARY

Main objective of the invention is the tensile reinforcement (TRI) of nylon 6.6 yarn above 12.0 g/dtex. The usage of high TRI yarns in preparation of tire cord reinforcements improves such tire performances as tire growth, rolling resistance and at the same time high speed durability when used as cap ply on belt package. In carcass applications it improves burst strength and enables to use thinner cords which lead to weight reduction.

BRIEF DESCRIPTION OF THE DRAWINGS

All parts of the figures are numbered which are referenced as shown below:
1. Inlet
2. Spin pack
3. Undrawn filament
4. Crossflow cooling air
5, Chamber 6. Conventional yarn
7. Feed roll assembly
8. First draw roll pair
9. Tube
10. Second draw roll pair
11. Relaxation roll
12. Let-down roll
13. Guide
14. Yarn package In FIG. 1, an example of a known crossflow quench and coupled spin-draw apparatus is shown for producing high modulus nylon 6.6 yarn. In FIG. 1, a melted polyamide is introduced at inlet (1) to a spin pack (2). The polymer is extruded as undrawn filaments (3) from the spin pack (2), which has orifices designed to give the desired cross section. The undrawn filaments (3) are quenched after they exit the capillary of the spin pack (2) to cool the fibers by crossflow cooling air (4). These filaments are converged into a conventional yarn (6) with application of a conventional finish lubricant in a chamber (5) and forwarded by a feed roll assembly (7). The conventional yarn (6) is then fed to a first draw roll pair (8) and then to a second and hot draw roll pair (10). A hot tube (9), or draw assist, may be used to facilitate the second stage of the draw process. The conventional yarn (6) is relaxed at puller rolls (11, 12), One of the puller rolls is also known as a relaxation roll (11); it can run at lower speeds than draw roll assembly (10) to control conventional yarn (6) shrinkage and stability of physical properties. Other roll is also known as a let-down roll (12) relaxes the conventional yarn (6) tension to allow winding on at a lower tension than the conventional yarn (6) experiences in drawing. A guide (13) lays down the conventional yarn (6) on a yarn package (14), where it is wound up. The process, apparatus and methods that are explained above are similar with prior art, and literature however standard operational conditions are differentiated to produce high TRI nylon 6.6 yarn different from the conventional yarn with reduced relaxation after hot-drawing.

DETAILED DESCRIPTION OF THE EMBODIMENTS

Figure 1:
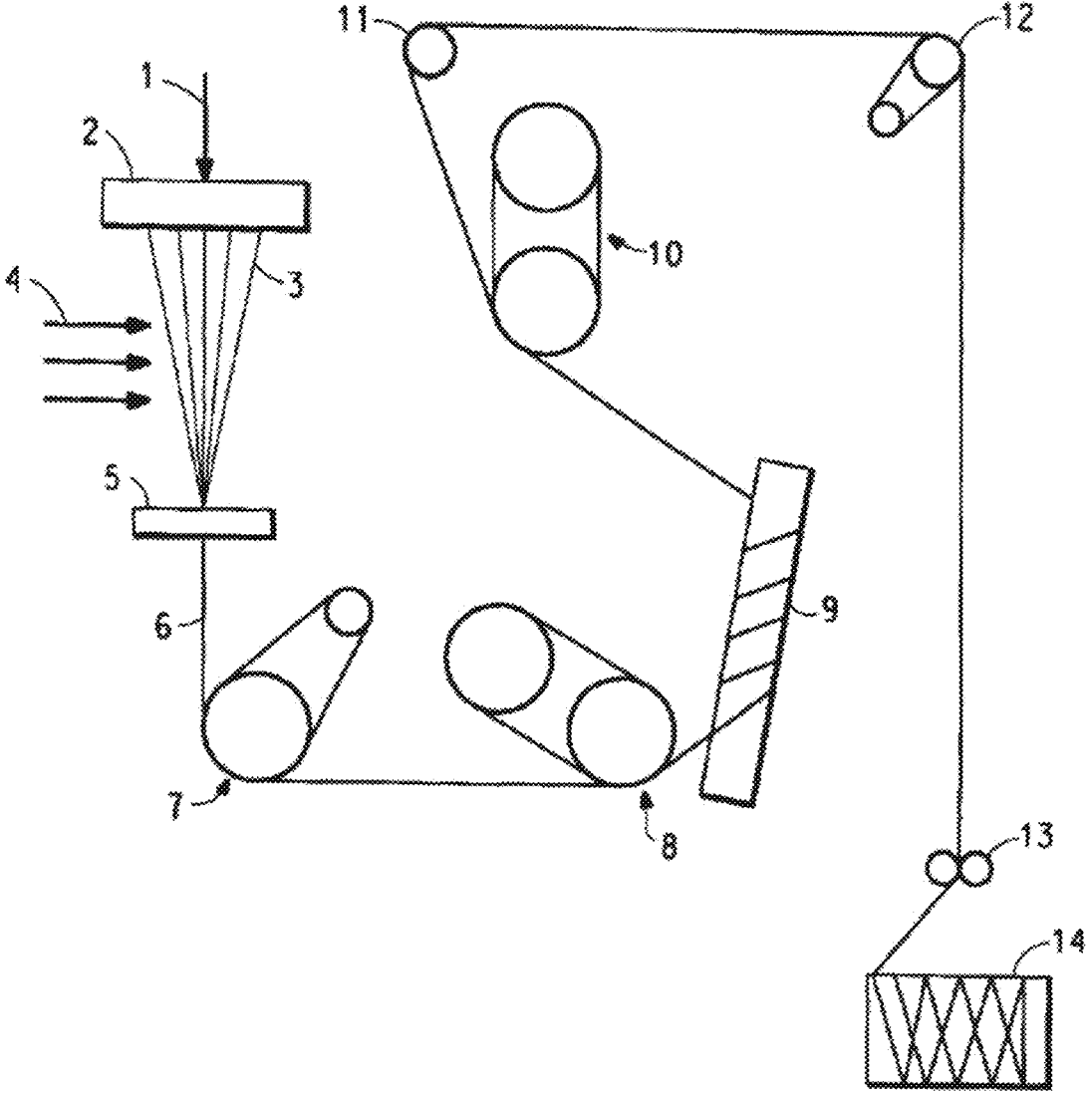
FIG. 1. is an example of a known crossflow quench and coupled spin-draw apparatus mentioned in the background of the invention (Prior art example).
Figure 2:
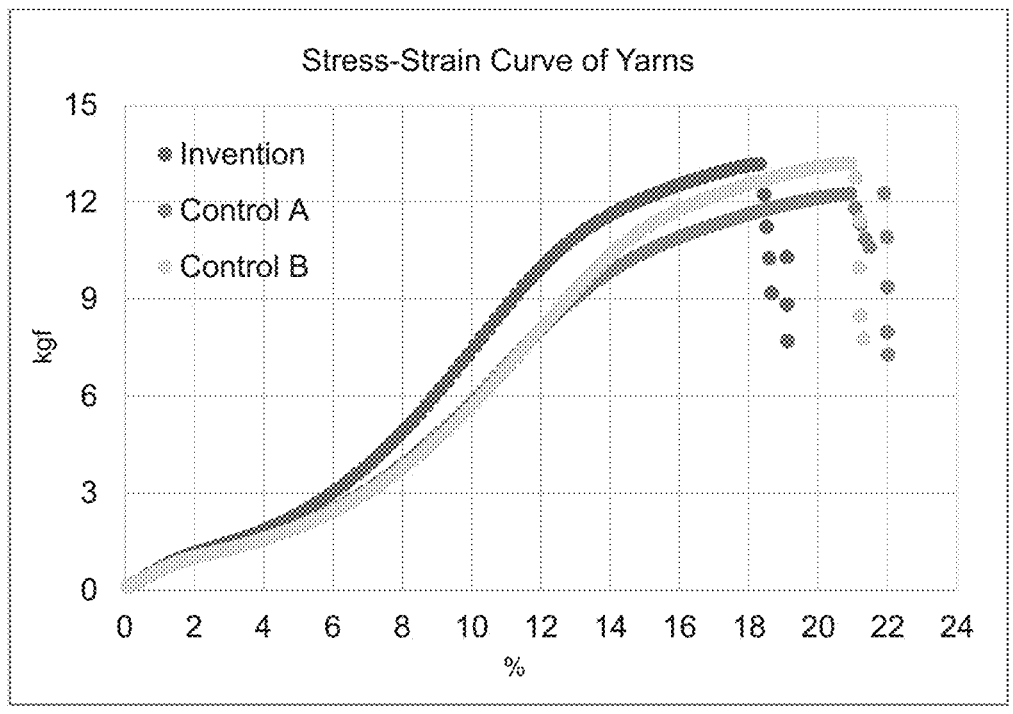
FIG. 2. is a stress-strain curve of invention with the control A and B.

The present invention relates to high tensile nylon 6.6 yarn having high Tensile Reinforcement Index (TRI) which is defined as below;

$$TRI\ (g/dtex)=Tenacity\ (g/dtex)+SASE\ at\ 7\%\ Elongation\ (g/dtex)$$

Wherein;
Tenacity: Breaking force/linear density (g/dtex)
SASE: Stress At Specified Elongation (g/dtex)
LASE: Load At Specified Elongation.

As well known, tensile strength (tenacity) and modulus, especially stress at 7% elongation (SASE) are two important tensile properties having significant effects on tire performance parameters like, high speed durability, rolling resistance and fuel saving.

In order to give the final properties to the cords, they subjected to the dipping (for static and dynamic adhesion) and heat-setting process (3T or hot stretching process) under high tension and temperature to enhance molecular orientation and dimensional stability further, Under the same 31 (Time, Tension and Temperature) conditions, nylon 6.6 cords prepared from high TRI nylon 6.6 yarn, give higher TRI value than the conventional nylon 6.6 cords.

Nylon 6.6 yarns having TRI value higher than 12.0 g/dtex and at the same time having tenacity between 9.3 g/dtex and 10.5 g/dtex are more suitable than the nylon 6.6 yarns with lower TRI. TRI which is higher than 12 g/dtex provides balance between high modulus and high strength. Regular nylon 6.6 yarns with high tenacity and low modulus or low tenacity and high modulus do not provide enough initial strength for final cords.

The nylon 6.6 yarns with Tensile Reinforcement Index (TRI) higher than 12.0 g/dtex have optimized and balanced tenacity and SASE which are suitable for tire cords which can be used as carcass and cap ply reinforcement in pneumatic tires. If the TRI parameter is higher than 13.5 g/dtex, due to excessive molecular orientation, the breaking energy or toughness of the yarn can be too low, and filaments could be brittle. Besides minimum 12.0 g/dtex TRI parameter, minimum 9.3 g/dtex and maximum 10.5 g/dtex tenacity will be preferable.

The linear density of the nylon 6.6 yarn produced according to invention is minimum 200 dtex and maximum 3000 dtex.

Table 1 shows comparison between the properties of the nylon 6.6 yarn produced according to the invention and control yarns A and B:

TABLE 1

| Form | | Conditioned* 1400 dtex Yarn | | |
| --- | --- | --- | --- | --- |
| Properties | Unit | Control A | Control B | Invention |
| Breaking Force | kgf | 12.2 | 13.20 | 13.20 |
| Tenacity | g/dtex | 8.7 | 9.4 | 9.4 |
| Elongation at Break | % | 21.0 | 21.0 | 18.8 |
| 7% LASE | kgf | 3.18 | 3.04 | 3.82 |
| 7% SASE | g/dtex | 2.27 | 2.17 | 2.73 |
| TRI | g/dtex | 11.03 | 11.62 | 12.13 |

*Condition 24° C. ± 1° C., 55% HR ± 2%

In table-1; Control A is regular tenacity and regular modulus (LASE) yarn having TRI<12.0 g/dtex, Control B is high tenacity, but regular modulus (LASE) yarn having TRI<(12.0 g/dtex and Invention is high tenacity, and high modulus (LASE) yarn having TRI>12.0 g/dtex.

The high TRI nylon. 6.6 yarns are used as tire cord reinforcement in pneumatic tires.

What is claimed is:

1. A nylon 6.6 yarn for a tire cord reinforcement for pneumatic tires comprising a Tensile Reinforcement Index (TRI) and a tenacity, wherein the TRI is defined as below:

TRI (g/dtex)=Tenacity (g/dtex)+Stress at 7% Elongation;

wherein the TRI is higher than 12.0 g/dtex and lower than 13.5 g/dtex, wherein the tenacity is between 9.3 g/dtex-10.5 g/dtex, and wherein the elongation at break is 18.8% when measured at 24° C.±1° C. and 55% Relative Humidity (RH)±2%.

2. The nylon 6.6 yarn according to claim 1, wherein the nylon 6.6 yarn has a minimum linear density of 200 dtex and a maximum linear density of 3000 dtex.

3. The nylon 6.6 yarn according to claim 1, wherein the nylon 6.6 yarn is used as the tire cord reinforcement for the pneumatic tires.

4. The nylon 6.6 yarn according to claim 1, wherein the density is 1400 dtex.

5. The nylon 6.6 yarn according to claim 1, wherein a load at 7% elongation is 3.82 kgf.

6. The nylon 6.6 yarn according to claim 2, wherein the nylon 6.6 yarn is used as the tire cord reinforcement for the pneumatic tires.

7. The nylon 6.6 yarn according to claim 4, wherein the nylon 6.6 yarn is used as the tire cord reinforcement for the pneumatic tires.

\* \* \* \* \*